US012574354B2

(12) United States Patent
Erb et al.

(10) Patent No.: US 12,574,354 B2
(45) Date of Patent: Mar. 10, 2026

(54) CLIENT FILTER VPN

(71) Applicant: NETSWEEPER (BARBADOS) INC., St. Michael (BB)

(72) Inventors: Jeremy D. Erb, Waterloo (CA); James W. Goruk, Nelson (CA)

(73) Assignee: NETSWEEPER (BARBADOS) INC., St. Michael (BB)

( * ) Notice: Subject to any disclaimer, the term of this patent is extended or adjusted under 35 U.S.C. 154(b) by 550 days.

(21) Appl. No.: 17/709,182

(22) Filed: Mar. 30, 2022

(65) Prior Publication Data

US 2022/0321537 A1 Oct. 6, 2022

Related U.S. Application Data

(60) Provisional application No. 63/168,719, filed on Mar. 31, 2021.

(51) Int. Cl.
*H04L 9/40* (2022.01)

(52) U.S. Cl.
CPC ...... *H04L 63/0272* (2013.01); *H04L 63/0236* (2013.01); *H04L 63/0281* (2013.01)

(58) Field of Classification Search
None
See application file for complete search history.

(56) References Cited

U.S. PATENT DOCUMENTS

| | | | |
|---|---|---|---|
| 9,467,454 | B2 | 10/2016 | Aravindakshan et al. |
| 9,609,460 | B2 | 3/2017 | Sinha |
| 9,954,664 | B2 | 4/2018 | Kalligudd |
| 10,484,336 | B2 | 11/2019 | Kumar et al. |
| 2004/0225895 | A1* | 11/2004 | Mukherjee ............ H04L 63/164 726/15 |
| 2012/0002813 | A1 | 1/2012 | Wei et al. |
| 2013/0298201 | A1 | 11/2013 | Aravindakshan et al. |
| 2013/0340067 | A1 | 12/2013 | Lindteigen |
| 2016/0330237 | A1 | 11/2016 | Edlabadkar |
| 2017/0078336 | A1* | 3/2017 | Aluvala ............... H04L 65/1069 |
| 2017/0289104 | A1* | 10/2017 | Shankar ............... H04L 63/166 |
| 2017/0310445 | A1 | 10/2017 | Kalligudd |

FOREIGN PATENT DOCUMENTS

| | | |
|---|---|---|
| CN | 101808005 A | 8/2010 |
| WO | WO-2011004258 A2 | 1/2011 |
| WO | WO-2012155817 A1 | 11/2012 |
| WO | PCT/IB2022/052986 | 3/2022 |

OTHER PUBLICATIONS

Science Direct, "Loopback Address." Loopback Address—an Overview | ScienceDirect Topics, 2013, URL: https://www.sciencedirect.com/topics/computer-science/loopback-address.

* cited by examiner

*Primary Examiner* — Syed A Roni

(74) *Attorney, Agent, or Firm* — Perry + Currier Inc.

(57) ABSTRACT

A user application is executed with an operating system. The operating system enables access to a remote network resource via a network interface and enables a virtual private network (VPN) connection. The operating system enforces use of the VPN connection by the user application. A network-access application is set as a remote endpoint of the VPN connection. The network-access application communicates with the remote network resource on behalf of the user application.

17 Claims, 6 Drawing Sheets

CLIENT FILTER VPN

CROSS-REFERENCE TO RELATED APPLICATIONS

This application claims priority to and claims the benefit of U.S. provisional patent application 63/168,719, filed Mar. 31, 2021, which is incorporated herein by reference.

FIELD

This disclosure relates to computer systems and data communications, and particularly filtering systems.

BACKGROUND

Computing devices are used for a wide-range of data communications. It may be useful to filter or otherwise manage data communications. For example, a company may establish rules for employees using company devices. In other examples, schools may wish to block certain websites and other content.

SUMMARY

According to an aspect of this disclosure, a device includes memory, a network interface, and a processor connected to the memory and the network interface. The processor is configured to execute an operating system to execute a user application and enable access to a remote network resource via the network interface, and enable a virtual private network (VPN) connection. The operating system enforces use of the VPN connection by the user application. The processor is configured to execute a network-access application executed by the operating system. The network-access application is set as a remote endpoint of the VPN connection. The network-access application is configured to communicate with the remote network resource on behalf of the user application.

The network-access application may be configured to selectively allow or block communications between the user application and the remote network resource.

The network-access application may be configured to monitor communications between the user application and the remote network resource.

The network-access application may be configured to modify communications between the user application and the remote network resource.

The network-access application may include a proxy configured to communicate with the remote network resource on behalf of the user application.

The network-access application may be configured to maintain a mapping of data packets communicated between the user application and a plurality of remote network resources to network connections provided by the proxy.

The network-access application may be configured to identify a data packet that does not conform to the mapping and, in response, open a new network connection at the proxy.

The network-access application may include a filter configured to selectively allow or block communications between the user application and the remote network resource.

The operating system may enforce use of the VPN connection by all applications except the network-access application.

According to an aspect of this disclosure, a method includes executing a user application with an operating system. The operating system enables access to a remote network resource via a network interface and enables a virtual private network (VPN) connection. The operating system enforces use of the VPN connection by the user application. The method further includes setting the network-access application as a remote endpoint of the VPN connection and the network-access application communicating with the remote network resource on behalf of the user application.

The method may further include the network-access application selectively allowing or blocking communications between the user application and the remote network resource.

The method may further include the network-access application monitoring communications between the user application and the remote network resource.

The method may further include the network-access application modifying communications between the user application and the remote network resource.

The method may further include the network-access application using a proxy to communicate with the remote network resource on behalf of the user application.

The method may further include the network-access application maintaining a mapping of data packets communicated between the user application and a plurality of remote network resources to network connections provided by the proxy.

The method may further include the network-access application identifying a data packet that does not conform to the mapping and, in response, open a new network connection at the proxy.

The method may further include the operating system enforcing use of the VPN connection by all applications except the network-access application.

DETAILED DESCRIPTION

The present disclosure describes techniques to filter network requests made by a client or end user, using a computing device, such as a smartphone, tablet computer, or laptop computer. The device may execute a network-access application that uses a virtual private network (VPN) software development kit (SDK) to redirect traffic through a filtering application. The filtering application does not create a VPN connection and does not backhaul traffic to a remote server. All communications between the device and the network may go through the filtering application. A remote VPN endpoint is not used. Rather, the VPN SDK is used to consume packets and redirect them for filtering purposes, and then send transmit packets off the device. The VPN may be set up by a mobile device management (MDM) system or may be installed by the user or client using the mobile computing device. The network-access application has full access to all traffic communicated through the VPN. The network-access application may thus filter network requests made by any other application on the device. The network-access application may perform this filtering by sending network requests to a remote server or remote system, receiving allow/deny decisions, and blocking or redirecting requests that are denied.

Figure 1:
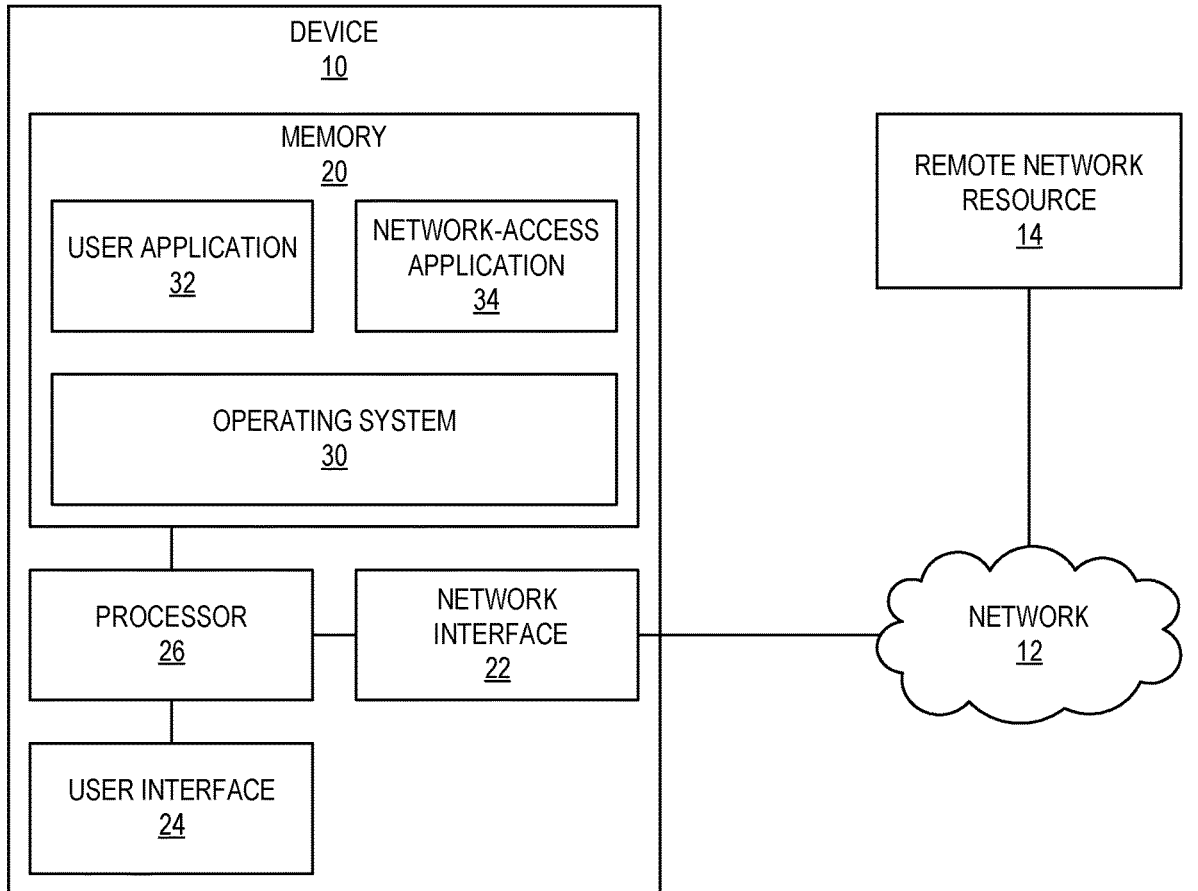
FIG. 1 is a block diagram of an example computer system according to the present disclosure.

As shown in FIG. 1, an electronic device 10 connects to a network 12 to communicate with a remote network resource 14. The device 10 may be a smartphone, tablet computer, or similar electronic device with a controlled or closed operating system, such as Android™ or iOS™. The remote network resource 14 may be a server, such as a website server, social media server, application server, or similar. The remote network resource 14 may include any number and type of servers and may be referred to as a server cluster or cloud. The network 12 may be a wide-area computer data network, such as the internet, and further may include a connected a wide-area network (WAN) or local-area network (LAN). Communication between the device 10 and the remote network resource 14 may be unidirectional or bidirectional, with bidirectional communication being normally expected. Any number of different devices 10 and remote network resources 14 may be provided for any number of users and services.

The device 10 includes memory 20, a network interface 22, and a processor 26 connected to the memory 20 and the network interface 22.

The memory 20 may include any suitable non-transitory computer-readable medium, such as read-only memory (ROM), random-access memory (RAM), flash memory, electrically erasable programmable read-only memory (EE-PROM), a solid-state drive (SSD), and a combination of such. The memory 20 may include volatile and non-volatile components.

The network interface 22 may include a suitable network adaptor and driver to communicate data over the computer network 12, such as a local-area network (LAN), wide-area network (WAN), the internet, or a combination of such. The computer network 12 may be wired, wireless, or a combination of such, and the network interface 22 may be configured appropriately.

The processor 26 may include a central processing unit (CPU), microprocessor, field programmable gate array (FPGA), or application-specific integrated circuit (ASIC) configurable by hardware, firmware, and/or software.

Instructions may be provided to the memory 20 for execution by the processor 26 to realize the functionality discussed herein, such as by implementing a network-access application, operating system, user application, and so on. Instructions may be directly executed, such as binary or machine code, and/or may include interpretable code, byte-code, source code, or similar instructions that may undergo additional processing to be executed.

The device 10 may further include a user interface 24. The user interface 24 may include any suitable device for processing user input/output, such as a display, touchscreen, button, speaker, microphone, and suitable combination of such. Examples of a device 10 that omits a user interface (or that has a very limited user interface) include Internet-of-Things (IoT) devices, such as networked cameras.

The memory 20 may store an operating system (OS) 30, a user application 32, and a network-access application 34, as well as data related thereto. The processor 26 cooperates with the memory 20 to execute code that implements the OS 30, user application 32, and network-access application 34. The applications 32, 34 are executed by the OS 30, which may provide and manage resources for the applications 32, 34, such as processor time and memory allocation.

The OS 30 further enables access to the remote network resource 14 via the network interface 22, which may include providing a network application programming interface (API) for the applications 32, 34 to reference. The OS 30 may enable VPN connections over the network 12. The OS 30 may be Android™, iOS™, or similar. For Android, the public class "VpnService" may be used (see https://developer.android.com/reference/android/net/VpnService). For iOS, a VPN extension point, such as "NEAppProxyProvider" and "NEPacketTunnelProvider," may be used (see https://developer.apple.com/documentation/networkextension/nepackettunnelprovider).

The OS 30 may be configured to the enforce use of a VPN connection by the user application 32. This may be done with an MDM application used with the device 10 or by manually setting up a VPN configuration profile via the OS 30. The OS 30 may so enforce the use of the VPN connection by all applications wherein this is possible, except the network-access application 34. Not enforcing the VPN connection on the network-access application 34 avoids an infinite loop.

The user application 32 may be an application specifically configured to communicate with the remote network resource 14. For example, the remote network resource 14 may provide a website, and the user application 32 may be a web browser or other user agent. In another example, remote network resource 14 may accept and provide image data and text data, and the user application 32 may be a social media application, such as Twitter™, Facebook™, or similar. In still another example, the remote network resource 14 may accept and provide data in a proprietary or customized format/protocol, and the user application 32 may be specifically written to communicate according to such format/protocol. In some examples, the user application 32 may be part of the OS 30, such as a web browser that is tightly integrated with the OS 30, such as by using a non-public API.

The network-access application 34 is set as a remote endpoint of the VPN connection that the OS 30 forces the application 32 to use. The network-access application 34 is configured to communicate with the remote network resource 14 on behalf of the user application 32. Because it is the VPN endpoint, the network-access application 34 can inspect the contents of the data packets that is handles. Accordingly, the network-access application 34 may be configured to selectively allow or block communications between the user application 32 and the remote network resource 14, monitor communications between the user application 32 and the remote network resource 14, modify communications between the user application 32 and the remote network resource 14, or a combination of such.

In various examples, the network-access application 34 is set as a remote endpoint of the VPN connection by way of an API exposed by OS 30. Such an API may allow the network-access application 34 to obtain callbacks for network traffic on a per-packet basis. That is, the network-access application 34 may receive a callback for each packet communicated to/from the device 10 and such a callback may provide the content of the packet. An API may additionally or alternatively provide a virtual interface for the network-access application 34. Further, the API may provide for registration of the network-access application 34. An example of registering the network-access application 34 includes the network-access application 34 extending a programmatic object and implementing any required function callback to process VPN data. The OS 30 may abstract low-level implementation details that are exposed to the network-access application 34 by the API.

Figure 2:
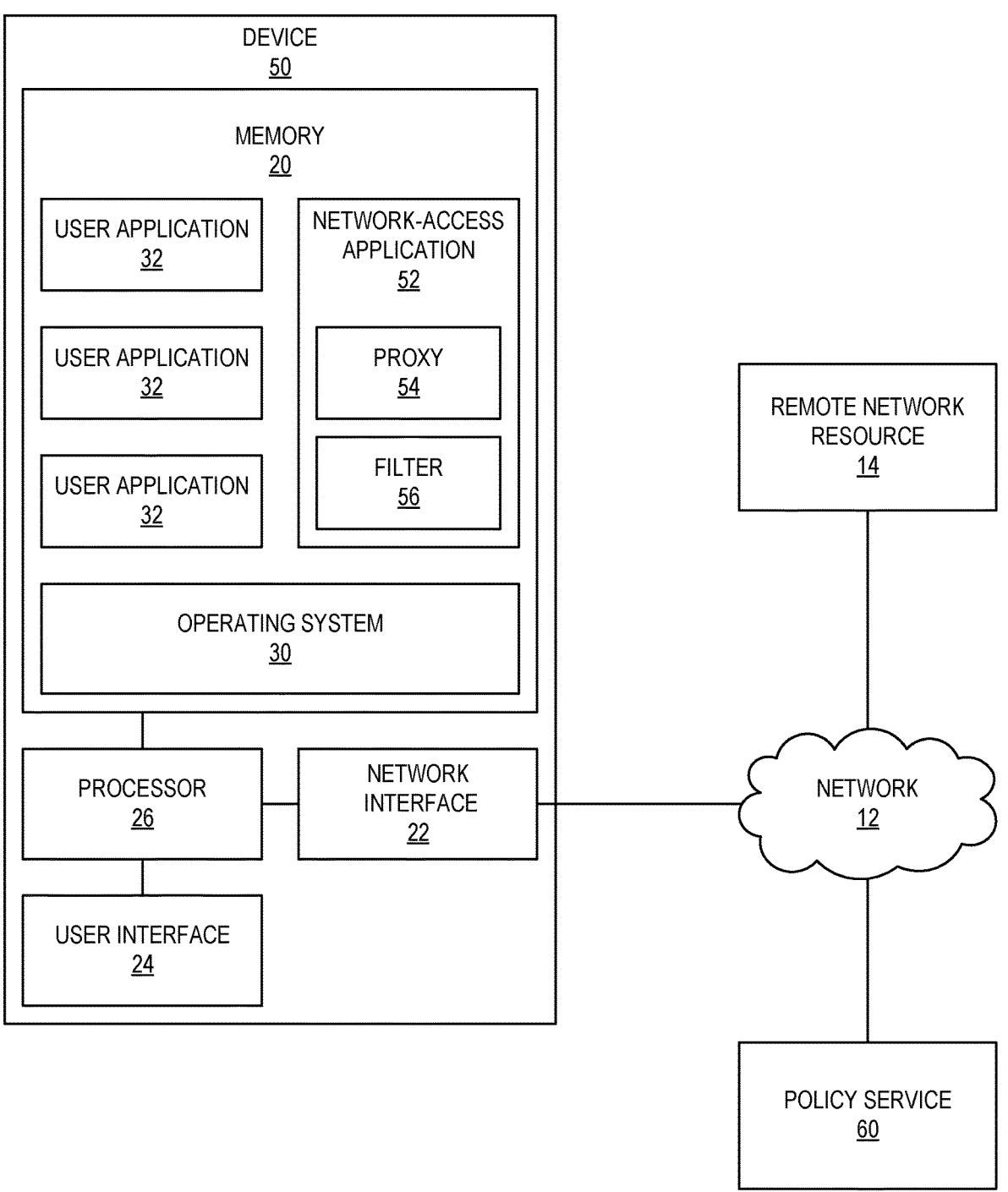
FIG. 2 is a block diagram of another example computer system according to the present disclosure.

As shown in FIG. 2, another device 50 includes another example of a network-access application 52 that includes a proxy 54 to communicate with the remote network resource 14 on behalf of the user application 32. In the examples discussed herein the proxy 54 is a transparent proxy. The proxy 54 may manage the relationship between network data packets as known to the OS 30 and user application 32 and network data packets as known to the network 12 and remote network resource 14.

The proxy 54 or other component of the network-access application 52 may maintain a mapping of data packets communicated between the user application 32 and a plurality of remote network resources 14 to network connections provided by the proxy 54. That is, the proxy may maintain a connection (or socket) for each flow of data between an endpoint user application 32 and remote network resource 14. When a data packet that does not conform to the mapping is identified, a new network connection may be opened at the proxy 54.

The network-access application 52 further includes a filter 56 to selectively allow, block, or modify communications between the user application 32 and the remote network resource 14. The filter 56 may inspect data packets and communicate information about such packets to a policy service 60 via the network 12. In other examples, the policy service 60 may be provided to the memory 20 of the device 50.

For example, the filter 56 may scan outgoing packets for new hypertext transfer protocol (HTTP) or HTTP secure (HTTPS) requests to uniform resource locators (URLs) by the user application 32 (e.g., web browser). If a URL is detected, then the filter 56 may provide such URL to the policy service 60 for a policy decision (e.g., is the user of the device allowed to access this URL?). The filter 56 may also provide information related to the device 50 and the person operating the device, such as a user group, age, job/role, employer, school, etc. The policy service 60 responds to the filter 56 with a command to allow or block the requested URL. A block command may identify a URL to which the filter is to redirect the user application 32. In some examples, the policy service 60 responds with either the requested URL, if allowed, or a redirect URL, if the requested URL is blocked. A redirect URL may be provided to the browser as an HTTP/HTTPS redirect, which may undergo the same policy-decision process discussed above and not be blocked. A server at the redirect URL may respond with an advisory message telling the user that the requested URL has been blocked. An example policy service is described in published PCT patent application WO2011004258, which is incorporated herein by reference.

Figure 3:
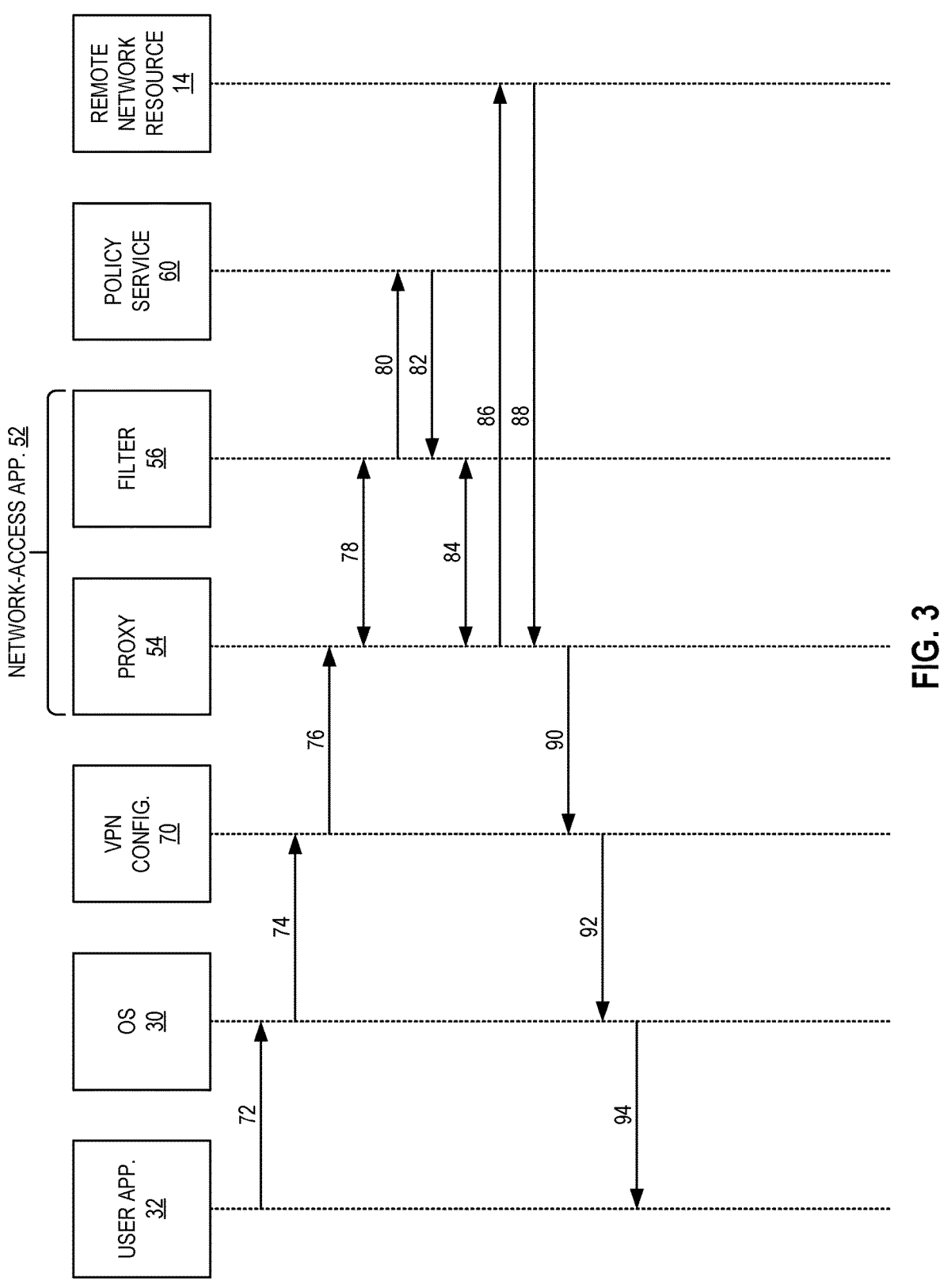
FIG. 3 is a data flow diagram of example communications of the example system of FIG. 2 when a request is allowed.

FIG. 3 shows an example of data flow in the system depicted in FIG. 2, in which communication between a user application 32 and remote network resource 14 is allowed. Note that some communications are omitted for sake of clarity, such as communications between a proxy 54 and/or filter 56 and the OS 30. It should be understood that, in various examples, the proxy 54 and/or filter 56 may make their network communications through the OS 30.

At communication 72, a user application 32 makes a request to a remote network resource 14 by first calling a function provided by the OS 30.

At communication 74, the OS 30 determines that a VPN configuration 70 is in effect for the application 32.

At communication 76, from the VPN configuration 70, the OS 30 determines the VPN endpoint to be a network-access application 52 and proxy 54 on the same device as the application 32 and OS 30.

At communication 78, the network-access application 52 determines that the request is subject to policy. This may include communication between the proxy 54 and a filter 56 associated with the network-access application 52.

At communication 80, the filter 56 requests a policy decision from a policy service 60.

At communication 82, the policy service 60 responds, in this example, with an indication that the original request from the user application 32 is to be allowed.

At communication 84, the filter and proxy may share knowledge of the policy decision.

At communication 86, the proxy 54 then makes the original request to the remote network resource 14 on behalf of the user application 32.

At communication 88, the remote network resource 14 responds to the proxy 54, which then provides the response back to the OS 30 via the VPN configuration 70, at communications 90 and 92.

At communication 94, the OS 30 then provides the data to the user application 32 that was originally requested at communication 72.

Figure 4:
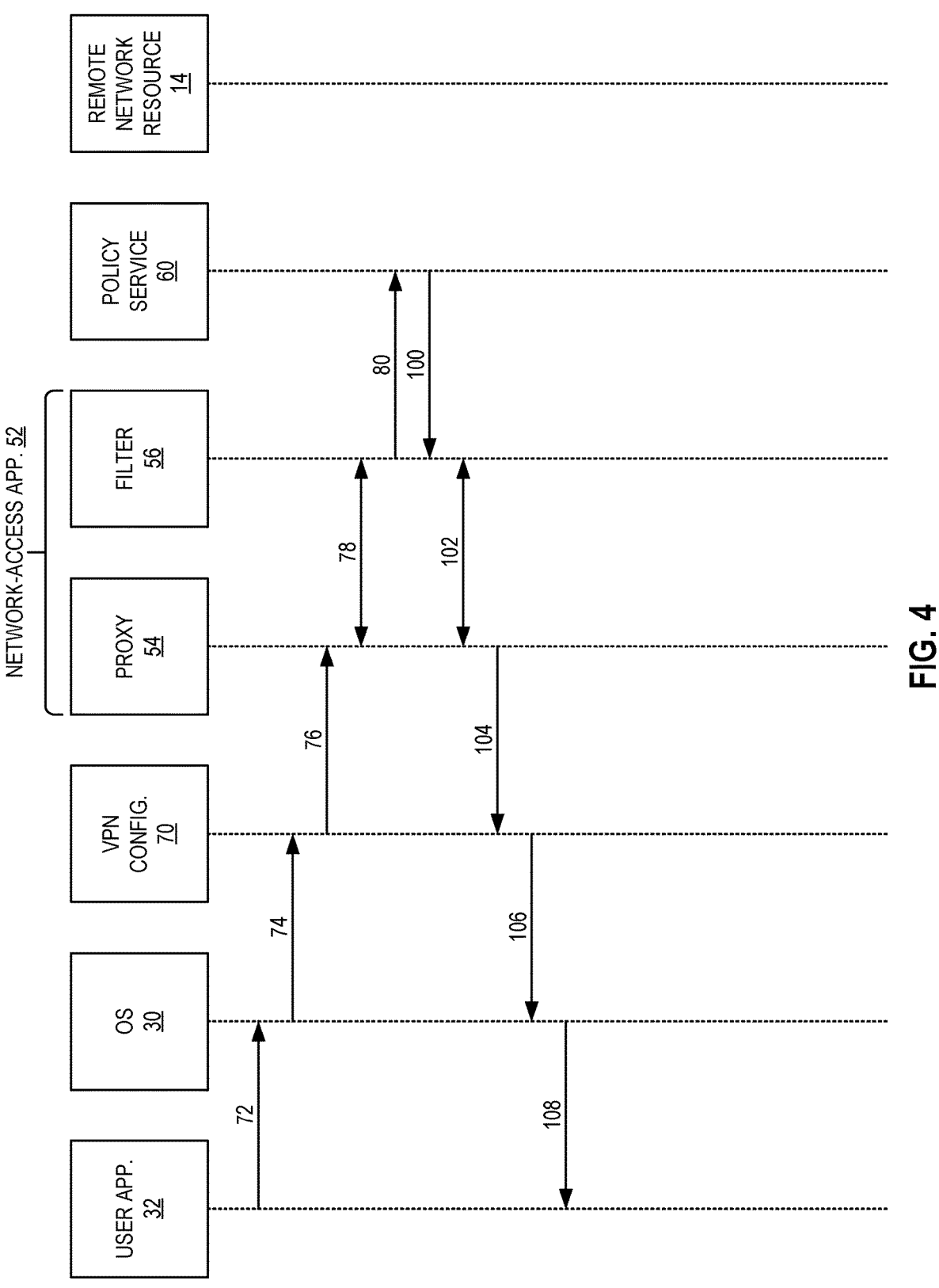
FIG. 4 is a data flow diagram of example communications of the example system of FIG. 2 when a request is denied.

FIG. 4 shows an example of data flow in the system depicted in FIG. 2, in which communication between a user application 32 and remote network resource 14 is blocked. Note that some communications are omitted for sake of clarity, such as communications between a proxy 54 and/or filter 56 and the OS 30. It should be understood that, in various examples, the proxy 54 and/or filter 56 may make their network communications through the OS 30.

At communications 72-78, as discussed above, a user application 32 makes a request that is processed by a VPN endpoint on the same device as the user application, i.e., by a network-access application 54.

At communication 80, the filter 56 requests a policy decision from a policy service 60.

At communication 100, the policy service 60 responds, in this example, with an indication that the original request from the user application 32 is not allowed and should be blocked.

At communication 102, the filter and proxy may share knowledge of the policy decision.

At communication 104 and 106, the proxy 54 provides an indication of the policy decision to block the request to the OS 30 via the VPN configuration 70.

At communication 108, the OS 30 then provides informs the user application 32 of the blocking of the original request at communication 72.

In various examples, at communication 100, the policy service 60 may provide a redirect address (e.g., a URL) with the indication that the original request is blocked. The user application 32 may be provided with the redirect address, via communications 104-106, and may make a new request for a resource at the redirect address. The processing of the new request may happen as shown in FIG. 3 (i.e., it is allowed) with a response from a different remote network resource 14 at the redirect address being a deny page or other advisory message that the application 32 can display or otherwise process.

Figure 5:
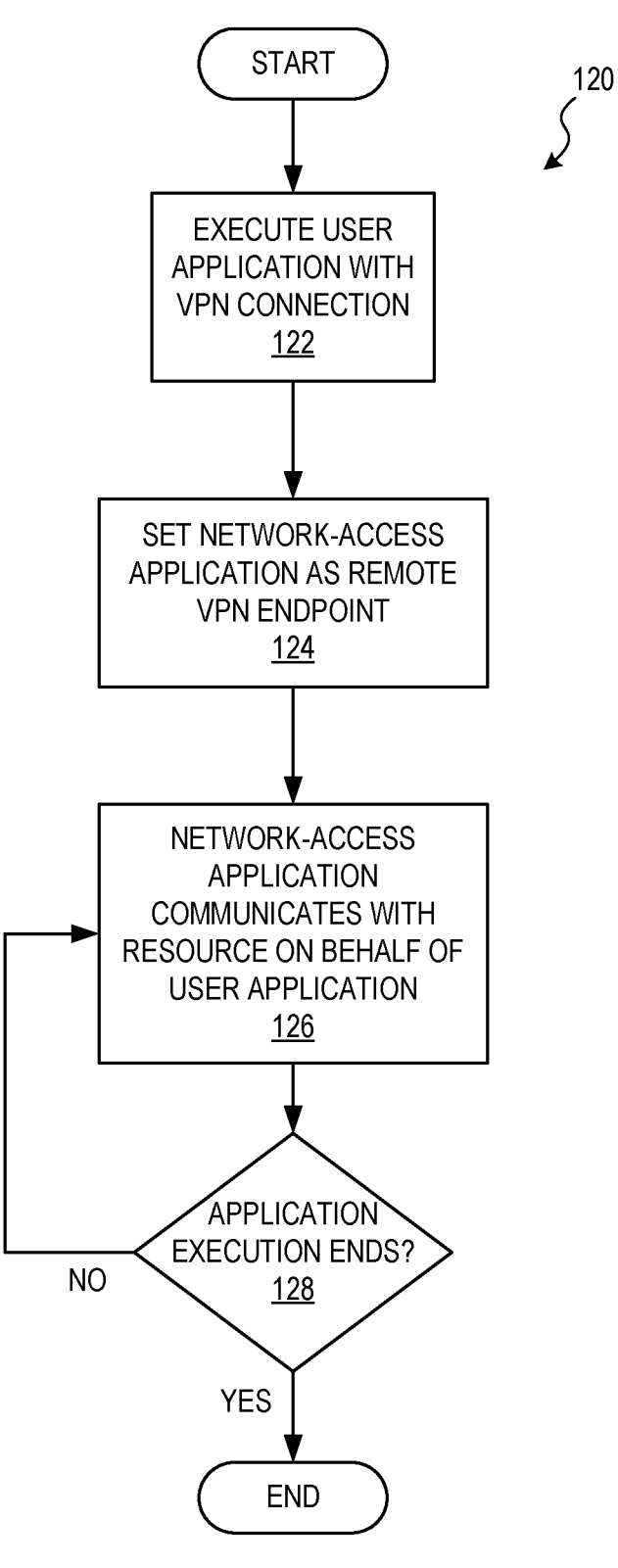
FIG. 5 is a flowchart of an example method according to the present disclosure.

FIG. 5 shows a flowchart of an example method 120. The method 120 may be implemented by a network access application, operating system, or other programmatic instructions executable by a processor.

At block 122, a user application is executed with an operating system. The operating system enables access to a remote network resource via a network interface. The operating system further enables a virtual private network (VPN) connection and enforces use of the VPN connection by the user application.

At block 124, a network-access application is set as a remote endpoint of the VPN connection. This may be done before or during start up of the user application. The operating system may enforce use of the VPN connection by all applications except the network-access application.

At block 126, the network-access application communicates with the remote network resource on behalf of the user application. A mapping of data packets to network connections may be referenced. If a data packet does not conform to the mapping, a new network connection may be opened.

The network-access application may monitor communications between the user application and the remote network resource, and further may selectively allow or block communications between the user application and the remote network resource. The network-access application may use deep packet inspection (DPI). In various examples, the network-access application may modify communications between the user application and the remote network resource, for example, to insert messages to the user of the user application, remove content, and so on. For example, a message may be inserted to indicate that certain content was removed.

The method 120 may end when execution of the application ends, via block 128. The method 120 may be performed continually and in parallel for various different applications.

Figure 6:
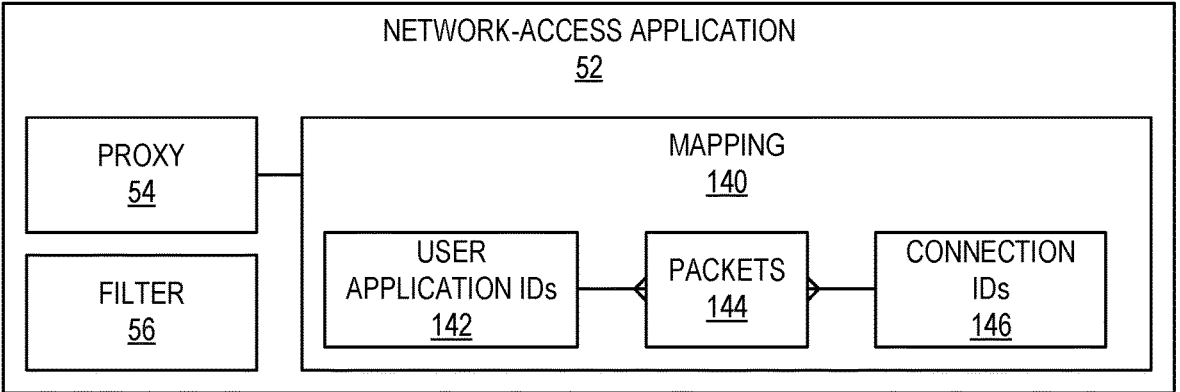
FIG. 6 is a block diagram showing an example mapping according to the present disclosure

FIG. 6 shows further detail of an example network access application 52. The network access application 52 may maintain a mapping 140 of data packets 144 and connection identifiers 146 for network connections provided by the proxy 54. The proxy 54 may maintain a connection (or socket) identifier 146 for each flow of data between an endpoint user application and a remote network resource. The mapping 140 associates data packets 144 to connection identifiers 146 and further associates user applications to data packets 144 via user application identifiers 142. Each user application identifier 142 may be associated with multiple data packets 144. Each connection identifier 146 may be associated with multiple data packets 144. A data packets 144 may be provided with a connection identifier 146 when, for example, a user application sends an outbound data packet 144. A remote network resource may maintain such connection identifiers 146 when responding with inbound data packets 144. Hence, the proxy 54 may use the mapping 140 to associate inbound data packets with the correct user application. When a data packet 144 that does not conform to the mapping 140 is identified, a new network connection 146 may be opened at the proxy 54 and a respective connection identifier 146 may be generated. This may occur when a user application begins a new communication with a remote resource.

In view of the above, it should be apparent that a client device may enable network access policy decisions, traffic monitoring, and the altering of communications using an application at the client device as an endpoint of a VPN created at the client device. Restrictions that an OS places on network traffic inspection, analysis, and manipulation may be bypassed, so that most or all significant network traffic to/from the device may be known at the application level.

This allows for an application to provide safety features, such the blocking of harmful websites and search results, to be implemented at client devices, particularly where such devices are used by children or others who do not wish to be exposed to such content.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A method comprising:
   executing a user application with an operating system on a client device, wherein the operating system enables access to a remote network resource via a network interface and creates a virtual private network (VPN) connection at the client device,[1] and wherein the operating system enforces use of the VPN connection by the user application;
   setting a network-access application, executed by the operating system, as an endpoint of the VPN connection at the device[2];
   the network-access application
   including:
      a proxy configured to communicate with the remote network resource on behalf of the user application by managing data the relationship between network packets as known to the user application and to the remote network resource;[3] and
      a filter configured to selectively allow, block, or modify communications between the user application and the remote network resource based on policy decisions received from a policy service;
   performing at least one of inspecting, filtering, and modification of traffic by the proxy and the filter.

2. The method of claim 1, further comprising the network-access application selectively allowing or blocking communications between the user application and the remote network resource.

3. The method of claim 1, further comprising the network-access application monitoring communications between the user application and the remote network resource.

4. The method of claim 1, further comprising the network-access application modifying communications between the user application and the remote network resource.

5. The method of claim 1, further comprising the network-access application using a proxy to communicate with the remote network resource on behalf of the user application.

6. The method of claim 5, further comprising the network-access application maintaining a mapping of data packets communicated between the user application and a plurality of remote network resources to network connections provided by the proxy.

7. The method of claim 6, further comprising the network-access application identifying a data packet that does not conform to the mapping and, in response, open a new network connection at the proxy.

8. The method of claim 1, further comprising the operating system enforcing use of the VPN connection by all applications except the network-access application.

9. A device comprising:
   memory;
   a network interface; and
   a processor connected to the memory and the network interface, the processor configured to execute:
      an operating system to execute a user application, enable access to a remote network resource via the network interface, and enable a virtual private network (VPN) connection, wherein the operating system enforces use of the VPN connection by the user application; and a network-access application executed by the operating system, at the client device,[4] the network-access application being set as a remote endpoint of the VPN connection;

wherein the network-access application comprises:

a proxy configured to communicate with the remote network resource on behalf of the user application by managing data the relationship between network packets as known to the user application and to the remote network resource; and a filter configured to selectively allow, block, or modify communications between the user application and the remote network resource based on policy decisions received from a policy service; and wherein the network-access application creates the VPN at the device[6] to enable inspection, filtering, and modification of traffic by the proxy and the filter.

10. The device of claim 9, wherein the network-access application is configured to selectively allow or block communications between the user application and the remote network resource.

11. The device of claim 9, wherein the network-access application is configured to monitor communications between the user application and the remote network resource.

12. The device of claim 9, wherein the network-access application is configured to modify communications between the user application and the remote network resource.

13. The device of claim 9, wherein the network-access application is configured to maintain a mapping of data packets communicated between the user application and a plurality of remote network resources to network connections provided by the proxy.

14. The device of claim 13, wherein the network-access application is configured to identify a data packet that does not conform to the mapping and, in response, open a new network connection at the proxy.

15. The device of claim 9, wherein the operating system enforces use of the VPN connection by all applications except the network-access application.

16. The device of claim 9 wherein the network-access application communicates without encryption with the remote network resource[7].

17. The device of claim 9 wherein the network-access application communicates with encryption[8] with the remote network resource.

* * * * *